May 1, 1951 L. P. LANGIS ET AL 2,551,141

TELEPHONE RECEIVER REST WITH ATTACHMENT FOR HOLDING RECEIVER SWITCHES

Filed Aug. 22, 1949

Louis P. Langis
Robert E. Langis
INVENTORS

BY Clarence A. O'Brien and Harvey B. Jacobson
Attorneys

Patented May 1, 1951 2,551,141

UNITED STATES PATENT OFFICE 2,551,141

TELEPHONE RECEIVER REST WITH ATTACHMENT FOR HOLDING RECEIVER SWITCHES

Louis P. Langis and Robert E. Langis, Westbrook, Maine

Application August 22, 1949, Serial No. 111,656

2 Claims. (Cl. 179—147)

This invention relates to telephone stands, and more particularly to an attachment for a telephone stand in which the receiver may be placed thereon without breaking the telephone circuit.

An object of this invention is to eliminate the objectionable noise transmitted through a telephone circuit each time the receiver, or handset is put down on a desk, table or other furniture of hard surface after a call has been received and a person asked for is not the one who answered the call. These noises referred to are heard by the party at the other end of the line.

Another object of the invention is to provide a selective contact breaker whereby the receiver or handset may be removed from the stand without closing the telephone circuit.

A further object of the invention is to eliminate table surface scratches or other markings on furniture which may result from placing the telephone receiver upon such surface.

These, and the various additional objects which will become apparent as the following description proceeds, are attained by this device which in general includes the provision of an auxiliary cradle for a telephone handset, in which the handset may be readily placed and from which it may be readily removed, in the event of a temporary interruption to a telephone conversation. This cradle is preferably detachably secured to the conventional stand provided for handset telephones. In addition, a retaining arm is secured to the detachably secured cradle. This device is shown in its preferred embodiment in the accompanying drawings, wherein:

Figures 1, 2:
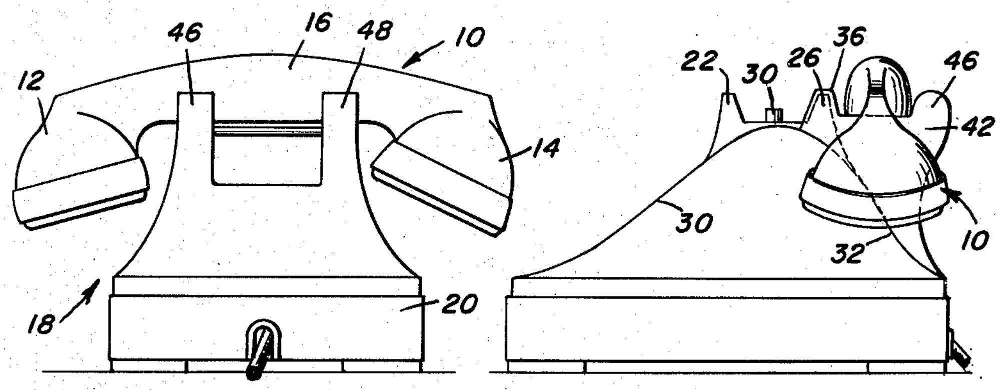
Figure 1 is a rear elevational view of a telephone handset showing the auxiliary cradle in position.
Figure 2 is a side elevational view of the present invention, and showing the telephone handset resting upon the auxiliary cradle.
Figure 3:
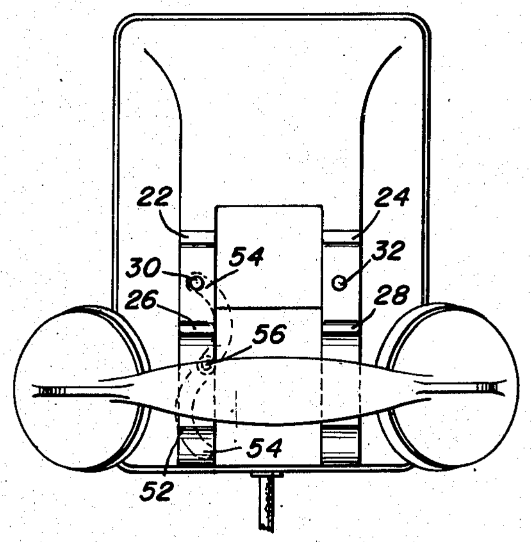
Figure 3 is a top plan view of the device, shown in position on the telephone stand.
Figure 4:
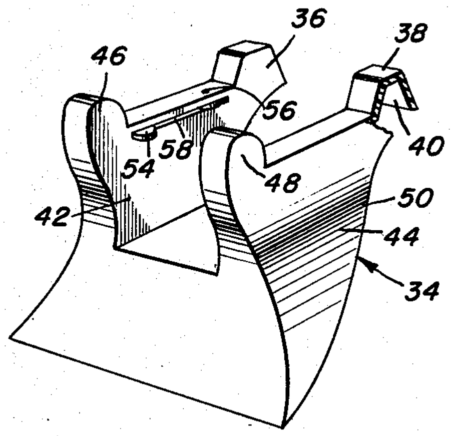
Figure 4 is a perspective view of the telephone stand attachment comprising the auxiliary cradle.

With continued reference to the accompanying drawings, wherein like reference numerals designate similar parts throughout the various views, reference numeral 10 generally designates a telephone handset comprising a receiver 12, a transmitter 14 and a hollow connecting handle 16 therebetween. The telephone handset is normally positioned upon a stand generally indicated by reference numeral 18 which comprises a base 20 and spaced pairs of upwardly extending studs 22 and 24, and 26 and 28. The studs are connected to the base by a central section having arcuate surfaces 30 and 32.

The telephone handset 10 is usually emplaced between the spaced pairs of upwardly extending studs so as to depress contact breaking switches 30 and 32 therebetween. It can thus be seen that when the receiver is raised to answer a call it cannot be replaced within the spaced pairs of studs without depressing the switches 30 and 32. Accordingly, the present invention has the concept of attaching an auxiliary cradle generally designated by reference numeral 34 onto the telephone stand to receive the handset without opening the telephone circuit.

The auxiliary cradle 34 comprises a pair of hollow upwardly extending retaining arms or members 36 and 38 which have side walls, and a top, to form hollows 40 into which pairs of the upwardly extending studs may be received. These members are connected to a spaced pair of walls 42 and 44. Another pair of upwardly extending studs 46 and 48 are formed together with the walls 42 and 44.

The surface of the cradle 34 below the upwardly extending arms 36 and 38 is contoured to intimately contact the arcuate surface 32 of the telephone stand and is denoted by reference numeral 50. A substantially U-shaped arm 52 having two ends 54 and 56 is positioned in a slot 58 extending through the wall 42. The arm 52 is pivotally mounted within the slot 58 by means of a pin 56 depending from the top of the retaining arm 36. The arm 52 is adapted to be rotated out of the slot 58. The slot 58 is so positioned through the wall 42 so that the arm when rotated outwardly will overlie and depress the contact switch 30. With the slots so emplaced over the switch 30 the receiver may be picked up for repairs, without closing the telephone circuit. Additionally, the arm 52 provides a means for maintaining the telephone circuit open even though the handset is jarred out of the cradle.

Since from the foregoing, the construction and advantages of the invention are readily apparent, it is not believed that further description will be necessary.

However, since numerous modifications and various embodiments in structure and design will readily occur to those skilled in the art after a consideration of the foregoing specification and accompanying drawings, it is not intended to limit the invention to the exact construction shown and described, but all suitable modifications and equivalents may be resorted to which fall within the scope of the appended claims.

Having described the invention, what is claimed as new is:

1. In combination with a telephone handset and stand therefor comprising spaced pairs of upwardly extending studs and contact switches positioned therebetween, an auxiliary cradle secured to said stand in contact therewith, said cradle having one surface contoured for intimate engagement with said stand and a pair of upwardly extending hollow members adapted to encompass a pair of said studs, a slot in one of said members, means pivotally mounting an arm in said slot, said arm being adapted to be rotated out of said slot and over said stand and into engagement with one of said switches.

2. An auxiliary cradle for use in combination with a telephone handset and stand having spaced upwardly extending studs and contact switches positioned between said studs comprising spaced pairs of upwardly extending hollow retaining members including side walls and a top wall, said members being open at the bottom thereof and being adapted to encompass a pair of said studs when placed thereover, horizontal slots in the side walls of one of said members, means pivotally attaching an arm to the top wall of said one of said members in said slots, said arm being rotatable out of said slots and over said stand and into engagement with one of said switches.

LOUIS P. LANGIS.
ROBERT E. LANGIS.

REFERENCES CITED

The following references are of record in the file of this patent:

UNITED STATES PATENTS

| Number | Name | Date |
|---|---|---|
| 1,849,277 | Casbarro | Mar. 15, 1932 |
| 2,300,114 | Golseth | Oct. 27, 1942 |
| 2,320,838 | Watson | June 1, 1943 |
| 2,326,591 | White | Aug. 10, 1943 |
| 2,518,554 | Kirby | Aug. 15, 1950 |